US010218779B1

(12) United States Patent
Cheng et al.

(10) Patent No.: US 10,218,779 B1
(45) Date of Patent: Feb. 26, 2019

(54) MACHINE LEVEL RESOURCE DISTRIBUTION

(71) Applicant: Google LLC, Mountain View, CA (US)

(72) Inventors: Liqun Cheng, San Jose, CA (US); Rama Krishna Govindaraju, San Jose, CA (US); Parthasarathy Ranganathan, San Jose, CA (US)

(73) Assignee: Google LLC, Mountain View, CA (US)

( * ) Notice: Subject to any disclaimer, the term of this patent is extended or adjusted under 35 U.S.C. 154(b) by 99 days.

(21) Appl. No.: 15/055,300

(22) Filed: Feb. 26, 2016

Related U.S. Application Data (60) Provisional application No. 62/121,335, filed on Feb. 26, 2015.

(51) Int. Cl.
*H04L 29/08* (2006.01)

(52) U.S. Cl.
CPC .......... *H04L 67/1008* (2013.01); *H04L 67/16* (2013.01)

(58) Field of Classification Search
CPC .......... G06F 3/0616; G06F 2212/7211; G06F 2212/1016; G06F 3/0653; G06F 11/008; G06F 2212/7208; G06F 3/0659; G06F 12/0871; G06F 3/0631; G06F 3/0632; G06F 17/30598; G06F 17/3053; G06F 11/3013; G06F 11/3065; Y02B 60/1225; Y02B 60/142; G11C 16/349; H04L 63/10; H04W 4/05
See application file for complete search history.

(56) References Cited

U.S. PATENT DOCUMENTS

| | | | | |
|---|---|---|---|---|
| 7,412,353 | B2 * | 8/2008 | Borkar | G06F 1/3203 702/186 |
| 8,924,645 | B2 * | 12/2014 | Chang | G06F 12/0893 711/118 |
| 9,450,876 | B1 * | 9/2016 | Marr | H04L 47/125 |

(Continued)

FOREIGN PATENT DOCUMENTS

WO    2013/126066    8/2013

OTHER PUBLICATIONS

Deng "Reliability-aware Server Consolidation for Balancing Energy-Lifetime Tradeoff in Virtualized Cloud Datcenters" 2013 International Journal of Communication Systems, Wiley Interscience, pp. 1-19 (Year: 2013).*

(Continued)

*Primary Examiner* — Sm A Rahman
*Assistant Examiner* — Ranjan Pant
(74) *Attorney, Agent, or Firm* — Fish & Richardson P.C.

(57) ABSTRACT

Methods, systems, and apparatus, including computer programs encoded on a computer storage medium, for machine level resource distribution are disclosed. In one aspect, a method is implemented in a data processing apparatus, which includes, for each server computer in a set of two or more server computers within a data center, wherein each server computer includes a plurality of processing cores, receiving wear data describing, for each processing core of the server computer, a wear level for the processing core that is indicative of accumulated wear of the processing core, and moderating accumulation of wear in the processor cores based on the wear level of the processing cores from at least two different server computers.

19 Claims, 5 Drawing Sheets

(56) References Cited

U.S. PATENT DOCUMENTS

| | | | | |
|---|---|---|---|---|
| 2005/0050373 A1* | 3/2005 | Orenstien | ............... | G06F 1/206 713/320 |
| 2006/0126107 A1* | 6/2006 | Cheung | ................ | G06F 3/1208 358/1.15 |
| 2007/0271475 A1* | 11/2007 | Hatasaki | ............... | G06F 1/3203 713/324 |
| 2007/0300086 A1* | 12/2007 | Kwasnick | ............ | G06F 9/5027 713/300 |
| 2008/0005537 A1* | 1/2008 | Apparao | .............. | G06F 9/5044 712/220 |
| 2008/0086395 A1* | 4/2008 | Brenner | ................ | G06Q 30/04 705/34 |
| 2011/0035072 A1* | 2/2011 | Jackson | ................ | G06F 1/3203 700/291 |
| 2011/0138395 A1* | 6/2011 | Wolfe | .................... | G06F 1/206 718/105 |
| 2011/0231860 A1* | 9/2011 | Kazama | ............... | G06F 9/5094 718/105 |
| 2011/0295999 A1* | 12/2011 | Ferris | ................... | G06F 9/5072 709/224 |
| 2012/0036398 A1* | 2/2012 | Moyer | .................... | G06F 9/505 714/48 |
| 2012/0297174 A1* | 11/2012 | Frank | .................... | G06F 9/5011 713/1 |
| 2013/0204991 A1* | 8/2013 | Skjolsvold | ............ | G06F 9/5083 709/223 |
| 2014/0025810 A1* | 1/2014 | Ghemawat | .......... | G06F 11/3024 709/224 |
| 2014/0096139 A1* | 4/2014 | Alshinnawi | ........... | G06F 11/008 718/103 |
| 2014/0359350 A1* | 12/2014 | Plank | .................... | G06F 9/5027 714/10 |
| 2015/0169363 A1* | 6/2015 | Anderson | ............. | G06F 9/4893 718/103 |
| 2015/0169382 A1* | 6/2015 | Anderson | ............. | G06F 9/5094 718/104 |
| 2015/0301964 A1* | 10/2015 | Brinicombe | ............ | G06F 13/28 710/308 |
| 2015/0375113 A1* | 12/2015 | Justice | .................. | A63F 13/355 463/42 |

OTHER PUBLICATIONS

Aggarwal et al., "Configurable Isolation: Building high availability systems with commodity multi-core processors," ISCA 2007, Proceedings of the 34$^{th}$ annual international symposium on Computer architecture, pp. 470-481, Jun. 2007.

Nathuji et al., "VirtualPower: coordinated power management in virtualized enterprise systems," SOSP 2007, Proceedings of twenty-first ACM SIGOPS symposium on Operating systems principles, pp. 265-278, Oct. 2007.

* cited by examiner

MACHINE LEVEL RESOURCE DISTRIBUTION

CROSS-REFERENCE TO RELATED APPLICATIONS

This application claims the benefit under 35 U.S.C. § 119(e) of U.S. Patent Application No. 62/121,335, entitled "MACHINE LEVEL RESOURCE DISTRIBUTION," filed Feb. 26, 2015. The disclosure of the foregoing application is incorporated herein by reference in its entirety for all purposes.

BACKGROUND

This specification relates to resource management in data centers.

Data centers are often used by service providers to deliver Internet based services to users. A data center, such as a server farm, typically contains hundreds or thousands of processing devices. Within the data centers the processing devices are arranged (or grouped) in clusters. Each cluster is configured to perform a distributed task in a parallel or pipelined fashion.

Modern processors used in data centers have several cores within a CPU chip. Among these cores, some are more active than others at any given instance of time due to a variety of reasons. Furthermore, the core that is more active changes over time. Each CPU can tolerate a finite number of cycles before becoming unreliable. Additionally, the operating temperature of a CPU also contributes the CPU's wear. Thus, very active cores operating at high temperatures wear out faster and fail earlier than cores that are less active or that operate at lower temperatures. When any core fails, the whole CPU needs to be replaced despite the fact that majority of cores are still functional. This incurs a significant replacement cost and reduces the useful lifetime of a CPU chip. Because there are typically many thousands of processing devices in a data center, device management can be costly.

SUMMARY

In general, one innovative aspect of the subject matter described in this specification can be embodied in methods that include the actions of, for each server computer in a set of two or more server computers within a data center, wherein each server computer includes a plurality of processing cores, receiving wear data describing, for each processing core of the server computer, a wear level for the processing core that is indicative of accumulated wear of the processing core, and moderating accumulation of wear in the processor cores based on the wear level of the processing cores from at least two different server computers. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The systems and methods disclosed herein moderate the accumulation of wear of cores to reduce wear across multiple different server computers. Moderating the accumulation of wear of multiple cores can extend the reliable and useful lifetime of the processor chips. By considering the accumulate wear of cores from two or more server computers, the systems and methods disclosed herein not only reduce wear in individual servers but also reduce wear across multiple, different servers. By considering multiple, different servers, moderation of wear among cores can be controlled in a manner that extends the service life of cores beyond what can be realized by moderating wear between cores only in individual server computers.

The systems and methods disclosed herein also allow for increased flexibility to overclock a fraction of the cores as needed. The mechanisms are transparent to user level applications. Furthermore, core remapping can be done in individual computers at times when the system requirements are very low, e.g. under very low load, to ensure the remapping is completely invisible to the user with no perceived slowdown. For example, in-memory key-value services often use a subset of cores while generating significant amount of memory and network traffic. Selecting cores in the proximity of memory controller and on-chip NOC can reduce latency and improve SLA.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A wear leveling system moderates the wear level for a set of processing devices performing a service based on a wear level of each of a set of one or more server computers. In some implementations, wear is proportional to amount of time a device has been in service, the amount of cycles a device has performed, and the operating conditions under which the device has operated over its lifetime. The wear leveling system controls wear such that each of the processing devices wear generally at the same rate to delay failure of an over-worked processing device in a group of relatively under-worked processing devices.

The wear level may be described by data that indicates the accumulated usage of a processing device or the current wear level of the processing device. When the wear level is a measure of the accumulated usage of the processing device, the wear level may describe the collected usage of the processing device from the time it was initially put in service to the present time. The accumulated usage may, in some implementations, be described by the present performance of the processing device as compared to the manufacturer specification performances.

The wear leveling process can implement a hierarchical system that assigns services to a server computer based on the wear level of each of the sever computers within a set of server computers. In addition, once services are assigned to a server computer, services can be further assigned to specific processor cores within the server computer based on the wear level of each of the processor cores.

In some implementations, a wear leveling system can moderate wear levels for a plurality of devices within a group of devices. For example, global-wear leveling can help maximize the lifetime of all server computers within a data center and maximize the lifetime of the data center as a whole. Wear leveling can be performed for each processing device within each of the server computers in a data center to ensure that wear of all processing devices within the data center occurs at approximately the same rate.

These features and other features are described in more detail below.

Figure 1:
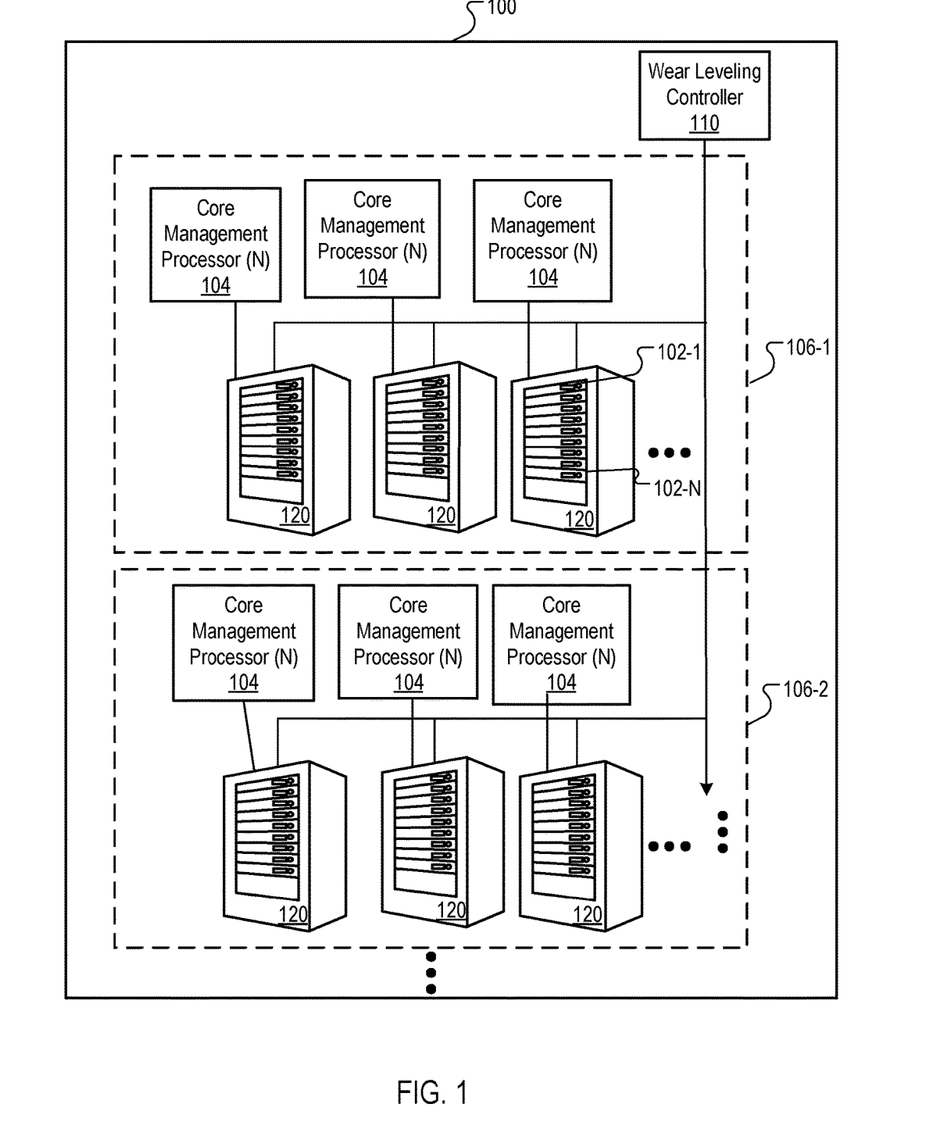
FIG. 1 is an illustration of a data center with sets of processing devices.

FIG. 1 is an illustration of a data center 100 having sets of processing devices 102 that are performing respective services. The data center 100 can occupy one or more rooms within a building or essentially an entire building. The data center 100 is sufficiently large for installation of numerous (e.g., dozens or hundreds or thousands) of processing devices 102. In some implementations, the processing devices 102 can be server computers. The server computers are typically arranged in racks 120 of computer equipment.

Each rack 120 includes multiple server computers, e.g., up to N server computers. In general, each server computer includes a motherboard, on which a variety of computer-related components are mounted. The racks 120 are in data communication and the server computers located within can be in data communication with other processing devices.

The racks 120 are configured in sets 106 (or "clusters"), and each set of server computers performs a service. The service is distributively implemented among the server computers, as will be described in more detail with respect to FIG. 2 below. Each set 106 is either logically or physically configured to distributively implement a service. Although sets and clusters are described, the domain of a service need not be limited to one set or cluster, and thus the systems and methods described below can be applied for a service implemented across multiple clusters.

A service can be any data processing operation the data center 100 facilitates. For example, each of the following are a service: processing of a search query to score resources and return the scores for the resources; processing of search query logs to identify trending queries; processing of data records in a map reduce operation, and so on.

A wear leveling controller 110 receives wear data for each server computer 102 in a set of two or more server computers within the data center. The wear leveling data can be partitioned according to a cluster 106, or can encompass an entire data center without a cluster partition. Each server computer 102 includes a plurality of processing cores. The wear data describes, for each processing core of the server computer, a wear level for the processing core that is indicative of accumulated wear of the processing core. The wear leveling controller 110 can moderate wear in the cores by, for example, assigning services to be implemented in one or more of the processing cores based on the wear level of the processing cores from at least two different server computers.

In some implementations, the wear level controller 110 can be solely responsible for managing wear levels in all cores. In other implementations, the assignment of tasks and management of cores is distributed between the wear level controller and core management processors 104. The wear level controller 110 communicates with a core management processor 104 in each server computer, and assigns tasks to each server computer 102 based on the respective wear levels of the server computers 102. The core management processor 104, however, assigns services to be implemented on each of the processing cores of the core management processor's respective server computer. These features are described in more detail with reference to FIG. 2, which is a block diagram of a dynamic performance controller for a set of server processing devices 202 performing a service in a data center.

Figure 2:
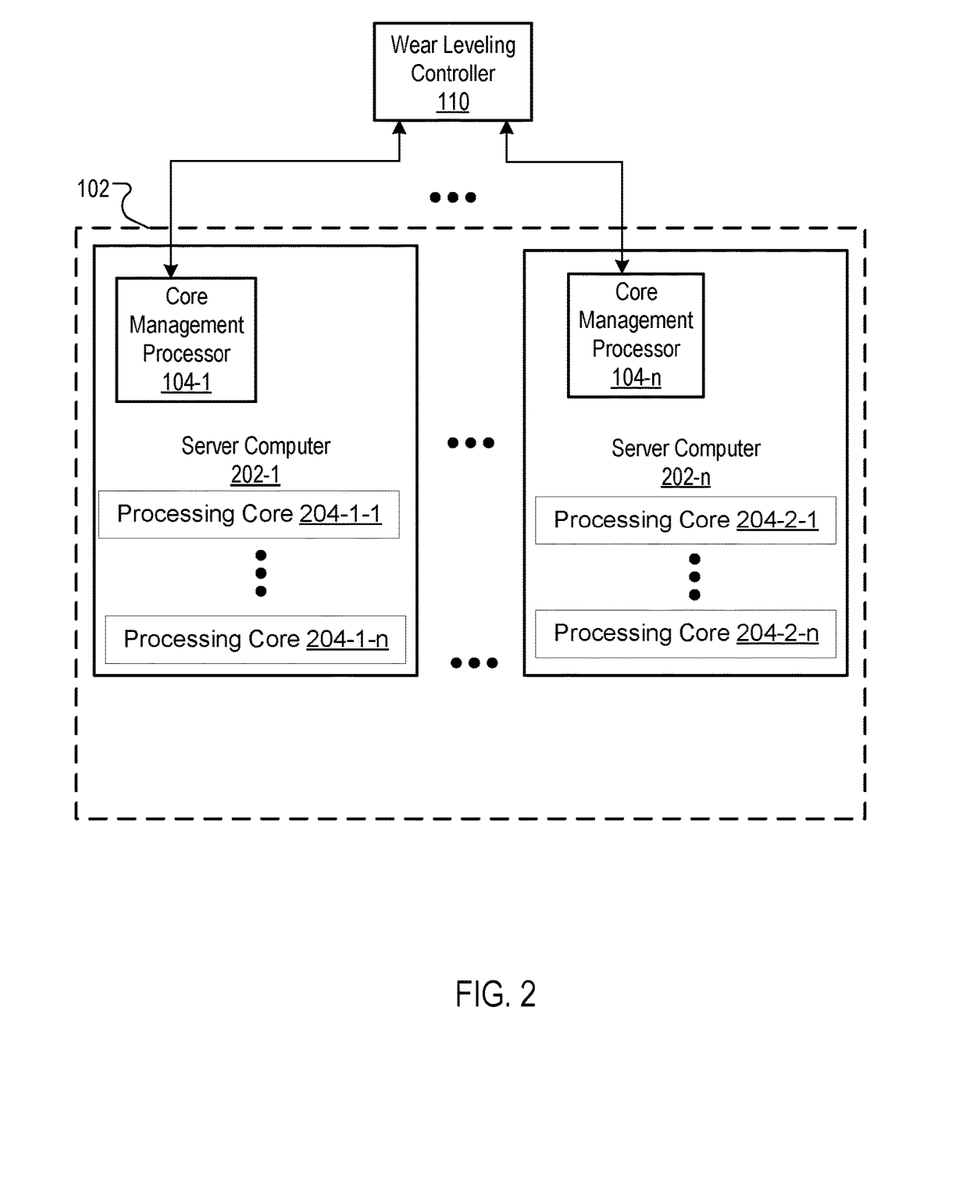
FIG. 2 is a block diagram of a wear level controller for a set of processing devices.

Each server computer 202 in FIG. 2 includes a core management processor 104 and a plurality of processing cores 204. Further, the wear leveling controller is communicatively connected to each of the server computers 202.

The wear leveling controller 110 communicates with the server computers 202 to receive wear data for each of the processing cores 204 for each server computer 202. In some implementations, the wear data describes a separate wear level for each processing core. In this implementation, the wear level controller 110 can manage the wear level for each core individually. Alternatively, the wear level data can describe an average age of all of the processor cores 204 within a server computer 202. In this other implementation, the managing of wear leveling may be hierarchal, where management at the core level is done within an individual server 102 by the core management processor 104, but management of overall tasks distribution is done by the controller 110.

The wear level data provides an indication of accumulated wear of the processor cores (e.g., the accumulated number of executed instructions, accumulated time in service since the original installation of the server computer, accumulated time in service since the server computer initially executed instructions, etc.), the operating temperature associated with each processing core, etc.

The wear leveling controller 110 can receive a request for services to be implemented on one or more server computers 202 within the data center. In some implementations, the wear leveling controller can query each server computer 202 for wear data for each processing core 204 of the server computer. The wear leveling controller 110 can manage wear among the cores, e.g., by assigning services to the processing cores 204, so that the relative differences in wear level of the processing cores are reduced. For example, if one processor core 204 exhibits more wear relative to another processor core 204 that exhibits less wear, the wear leveling controller may assign the services to be executed on the processor core 204 that exhibits less wear to reduce the difference in the wear level between the two processing cores.

The wear leveling controller 110 can determine, for each server computer wear levels for the processing cores 204 of the server computer 202. In some implementations, the wear leveling controller 110 can compare the wear levels for the processing cores 204 to determine an order of wear for the processing cores 204. Based on the wear levels for the processing cores 204 of the server computer 202, the wear level controller schedule services for the processing cores of the server computers. The schedule defines an order by which the processing cores are schedule to execute the services. For example, the wear level controller 110 can assign services in an order that starts with processing cores with the least amount of wear to processing cores with the most amount of wear from among the server computers 102. Other ways of moderating the accumulation of wear can also be used. For example, the wear level controller can assign the number of instructions to be executed on the processing cores 204 according to the schedule such that processing cores that show less wear are assigned more instructions to execute and processing cores 204 that show more wear are assigned less instructions to execute.

When scheduling services, the wear level controller 110 can prioritize services and modulate wear, based, in part, on the priority of each service. To do so, the wear leveling controller 110 can determine a priority for each service relative to other services. In some implementations, higher priority services may be executed on a processor core that exhibits less wear to ensure successful execution of the higher priority service. For example, a wear leveling controller 110 can assign a service with a priority that is higher than the priority of other services to a processing core 204 for which the wear level indicates an accumulated wear that is less than the wear level of a processing core 204 for which another service with a lower priority is scheduled.

Services that are to be implemented on one or more processing cores 204 can be determined to be resource intensive. In some implementations, a resource intensive service is a service that has more instructions to execute relative to other services with the typical number of instructions. In addition, a resource intensive service can be a service that utilizes a greater number of processing cores 204 or server computer components to execute the instructions for the service.

Accordingly, the wear leveling controller 110 can determine a resource intensity value for each service that is indicative of a level of wear that a processing core will incur by performing the service. For example, the resource intensity value can be a parameter that describes the number of instructions to be executed on a processing core 204. The wear leveling controller 110 can determine how much wear will be incurred to a processing core 204 according to the number of executable instructions. The wear controller can assign the resource intensive service to the processing cores 204 so that the relative differences in wear level of the processing cores 204 are reduced.

In some implementations, the wear leveling controller 110 can monitor the performance of each processing core by creating the wear data for the processing core. The wear data can describe benchmark measurements for the processing core 204. For example, the benchmark measurements can describe accumulated instructions executed by the processing core 204. The benchmarks can be an indication that a processing core has executed a certain number of instructions. A predetermined number of executed instructions can define a wear level of the processing core 204. While wear may be measured by accumulated values, e.g., time, instructions, etc., another way of measure accumulated wear is by the performance of the core relative to a performance specification.

Figure 3:
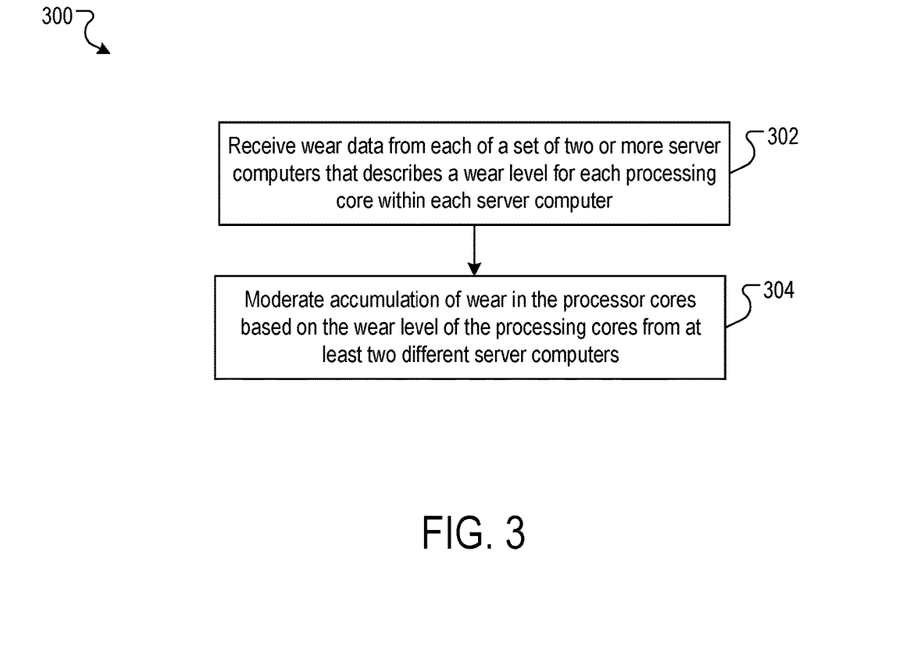
FIG. 3 is a flow diagram of an example process for assigning services to processing devices.

FIG. 3 is a flow diagram of an example process for assigning services to processing devices. The process can be implemented in the wear leveling controller 110 or distributively implemented in the core management processor 104 and the wear leveling controller 110.

The process 300 receives wear data from each of a set of two or more server computers 202 within a data center (302). Each of the server computers 202 includes a plurality of processing cores for executing services. The wear data can describe a wear level that is indicative of accumulated wear for each processing cores 204. For example, the wear data can describe an age of each of the processing core. In some implementations, age can describe a cumulative metric (e.g., hours in use, number of executed instructions, etc.) that is indicative of the accumulated usage for each of the plurality of processing cores. In other implementations, age can be indicative of a remaining useful life for each of the plurality of processing cores.

The process 300 accumulation of wear in the processor cores based on the wear level of the processing cores from at least two different server computers (304). For example, the process 300 assigns services to be implemented in one or more of the processing cores 204 based on the wear level of the processing cores from at least two different server computers. Assigning services to be implemented in one or more of the processing cores based on the wear level of the processing cores can include assigning services to processing cores that have a younger age relative to the other processing cores.

Figure 4:
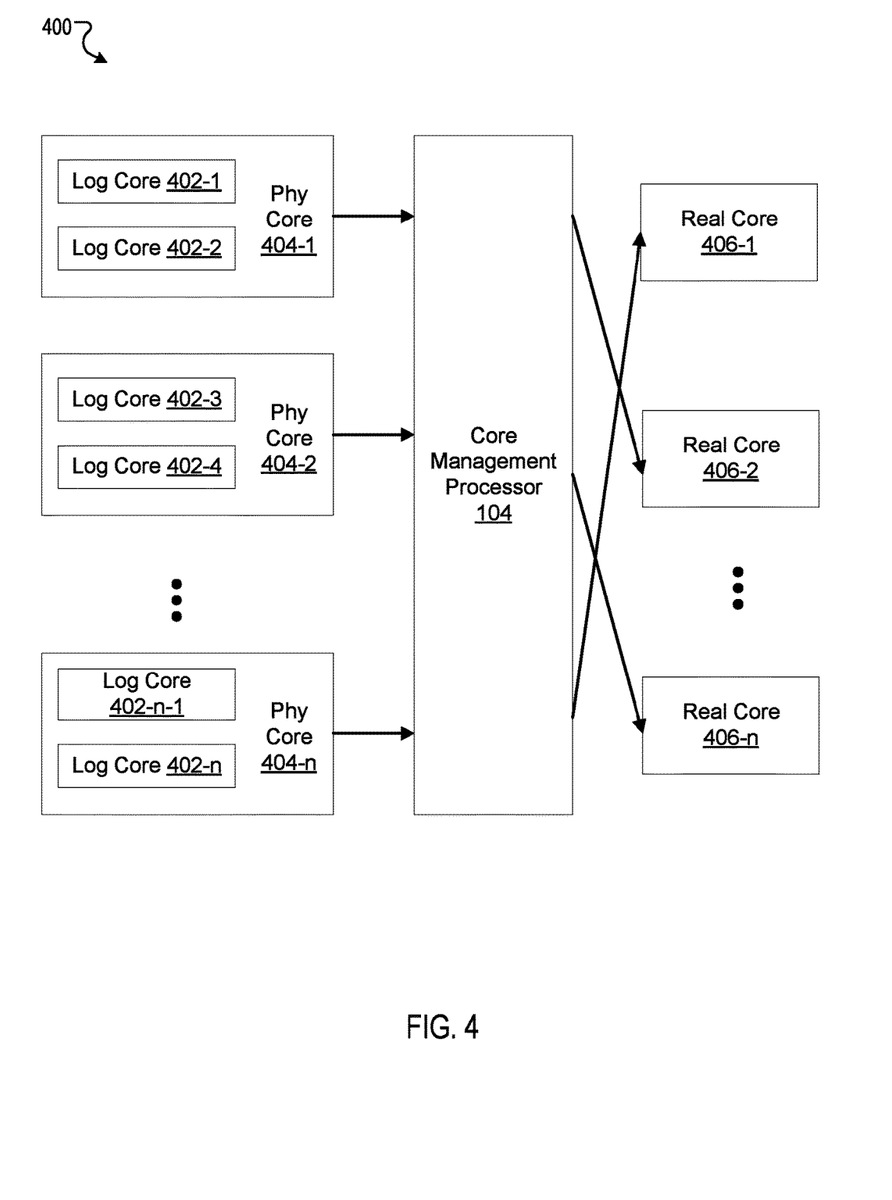
FIG. 4 is a block diagram of service assignment performed by a control management processor.

In implementations in which wear leveling is distributed and the wear level controller 110 is not solely responsible for managing wear, the server computers 102 may include a core management processor 104 that manages wear among cores within the computer. This results in a hierarchical wear leveling architecture. FIG. 4 is a block diagram of service assignment performed by a core management processor 104 within a server computer 202. The core management processor can perform load balancing and wear leveling among cores on the same server computer 202. In some implementations, a server computer 202 includes one or more logical cores 402, one or more physical cores 404, at least one core management processor 104, and one or more real cores 406.

A physical core 404 can uniquely identify a real core 406 (e.g., the actual processing core 204) within a server computer 202. In some implementations, instructions to be implemented on a physical core 404 can be mapped to the same and/or different real cores 406 according to the wear level of the real cores 406, resource availability of each of the real cores 406, clocking speed of the real cores 406, operating temperature of the real cores 406, or any combination of attributes that can define processing core resource assignments. For example, physical core 404-1 may always be mapped and assigned to execute instructions on the same real core 406-1. In other examples, physical core 404-1 may be mapped to any of a plurality of real cores 406-1-406-$n$ according to which core exhibits the least level of wear relative to the other real cores 406 or any combination of service assignment parameters.

A logical core 402 can be a programming extraction that represents a hardware implementation visible to the operating system as a resource that can be scheduled. In some implementations, a logical core 402 can be a software implemented partition of a physical core 404 where a physical core 404 can be partitioned into multiple logical cores 402 as shown in FIG. 4. Instructions for a service can be divided between the multiple logical cores 402 of a physical core 404. For example, instructions for a service can be spilt such that logic core 402-1 and logic core 402-2 can execute their respectively assigned instructions and when compiled, all instructions for the service have been executed between the two logic cores 402.

As previously described, the core management processor 104 balances workloads (e.g., assigned services, etc.) among real cores 406 to ensure all processing cores 204 within a server computer 202 wear at a similar pace. In some implementations, the core management processor 104 monitors and records wear data for each real core 406. Wear data can describe a wear level for a server computer that is attributed to the processing cores of the server computer 202. The core management processor 104 can assign services to real cores 406 according to wear data for each processing core 204. One example will be discussed in greater detail in connection with FIG. 5.

The core management processor 104 can update the mapping between physical cores 404 and real cores 406. In some implementations, the mapping update between physical cores 404 and real cores 406 can be updated in real-time, according to a predetermined schedule, or any other mechanism of the like. The core management processor 104 can modify which physical core 404 is mapped to which of multiple real cores 406. The mapping of the physical cores 404 to the real cores 406 can determine which real cores 406 will be assigned the services that are assigned to corresponding individual physical cores 404. For example, as shown in FIG. 4, physical core 404-1 can be mapped to real core 406-2, physical core 404-2 can be mapped to real core 406-$n$, and physical core 404-$n$ can be mapped to real core 406-1.

Processing cores 204 that have assigned services can have their execution properties modified to ensure that the processing cores 204 wear at a similar rate. In some implementations, the execution properties are modified to enhance the performance of the processing cores while maintaining a reliability constraints (e.g., allowable operating temperature) for each of the processing cores. A processing core 204 can be under-clocked (e.g., execute instructions at a slower than typical rate) to reduce wear on the processing core 204. For example, a processing core 204 may operate at 3.4 GHz, and the processor core may send wear data that describes the processing core has a higher wear level relative to other processing cores. The core management processor 104 may send instructions to the processor core to temporarily or permanently operate at 3.0 GHz to reduce operating temperature and/or the wear applied on the processing core 204.

Alternatively, if a number of mapped physical cores is less than a number of cores in the sever computer, then the core management processor 104 can temporarily increase the clock speed of cores that are being utilized and iterative remap the physical cores to the actual cores so that the overclocked cores do not, over time, exceed a temperature constraint. In particular, the core management processor 104 iteratively remaps the number of mapped cores to a proper subset of cores, and for each remapping the proper subset of cores changes. The cores are selectively overclocked at each remapping so that the proper subset of cores clocked to an overclocked value do not exceed a temperature constraint before a next iterative mapping. Thus, the core management processor 104 may over-clock the cores by dynamically updating the mapping between the physical cores 404 and the real cores 406 to ensure all of the real cores 406 are used and wear is evenly distributed across all of the real cores 406.

Figure 5:
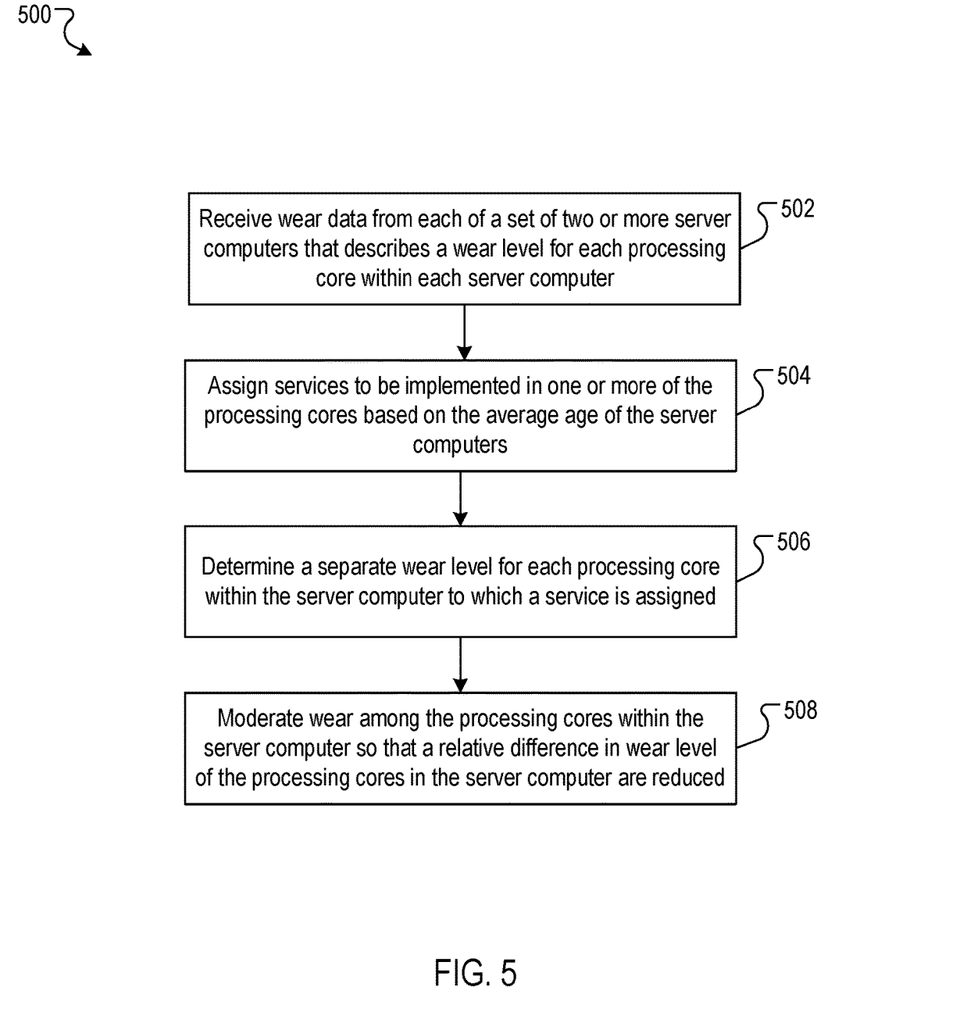
FIG. 5 is a flow diagram of hierarchal service assignment.

FIG. 5 is a flow diagram of hierarchal service assignment for each of the processing cores 204 within each server computers 202 based on wear data for each of the processing cores 204. The process can receive wear data from each of a set of two or more server computers 202 that describes a wear level for each processing core 204 within each server computer 202 (502). In some implementations, the wear data describes a wear level for a server computer 202 that is attributed to the processing cores 204 of the server computer 202.

For example, wear data can include data that describes an average age of the processing cores 204 of the server computer for each server computer 202 within a data center 100. The wear leveling controller 110 can receive wear data describing the age of each processing core 204 within the server computer 202 and determine the average age of the processing cores 204. Alternatively, the wear leveling controller 110 can receive data that describes the average age of the processing cores 204 within the server computer 202.

Accordingly, the wear leveling controller 110 can assign services to be implemented in one or more of the processing cores 204 based assigning services to a server computer 202 with younger average age relative to the average age of other server computers (504). For example, a server computer 202 that is determined to have processing cores 204 that are younger in age relative to the age of processing cores 204 of other server computers within a data center 100 may be assigned services. Assigning services to the younger server computer 202 can implement a global-wear leveling of all processing cores 204 within a data center 100. Global-wear leveling can help maximize the lifetime of all server computers 202 within a data center 100 and maximize the lifetime of the data center 100 as a whole.

The process can determine a separate wear level for each processing cores 204 within the server computer to which a service is assigned (506). In some implementations, the wear leveling controller 110 can determine the separate wear level for each of the processing cores 204. Alternatively, the core management processor 104 can determine the separate wear level for each of the processing cores 204 within the server computer 202. The separate wear level for each of the processing cores 204 can be the wear level of each individual processing core 204 within the server computer that was assigned services step 504.

Accordingly, the process assigns the service to the processing cores within the server computer so that a relative difference in wear level of the processing cores in the server computer is reduced (508). In some implementations, upon determining the wear level of each of the processor within the server computer 202 that the services were assigned, a schedule or order for assigning services to each of the processing cores 204 can be developed based on the wear levels of each of the processing cores within the server computer 202. Typically, the processing core(s) 204 that exhibit the least amount of wear relative to the other processing cores within the server computer will be assigned services to further promote equal wear among the processing cores 204. The hierarchical assignment of services provides another mechanism for global wear-level management for each processing core 204 within a group of server computers 202 (e.g., a group of server computers 204 within a data center 100).

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, comprising:
   receiving a request for services to be implemented on one or more server computers within a set of two or more server computers within a data center, wherein each server computer includes a plurality of processing cores;
   querying each server computer in the set of two or more server computers for wear data for each processing core of each server computer;
   for each server computer in the set of two or more server computers, receiving the wear data describing, for each processing core of the server computer, a wear level for the processing core that is indicative of accumulated wear that has accumulated from an originating time in service of the processing core; and
   moderating accumulation of wear in the plurality of processing cores, to which services are to be assigned, in a first server computer and a second server computer, the moderating comprising:
      determining, based on the wear level of the processing cores from the first server computer and the second server computer, that the services are to be implemented in one or more of the processing cores of the first server computer and one or more of the processing cores of the second server computer; and
      assigning the services to be implemented in the one or more of the processing cores of the first server computer and the one or more of the processing cores of the second server computer.

2. The method of claim 1, wherein assigning services to be implemented in one or more of the processing cores comprises:
   determining, for each server computer for which services are assigned:
      wear levels for the processing cores of the server computer; and
      based on the wear levels for the processing cores of the server computer, a schedule of services for the processing cores of the server computer, wherein the schedule of services defines an order by which the processing cores are schedule to execute the services.

3. The method of claim 1, wherein assigning services to be implemented in one or more of the processing cores comprises:
   determining a priority for each service relative to other services; and
   assigning a service with a priority that is higher than a priority of other services to a processing core for which the wear level indicates an accumulated wear that is less than the wear level of a processing core for which another service with a lower priority is scheduled.

4. The method of claim 1, wherein assigning services to be implemented in one or more of the processing cores comprises:
   determining, for each service, a resource intensity value that is indicative of a level of wear that a processing core will incur by performing the service; and
   assigning the services to the processing cores so that relative differences in wear level of the processing cores are reduced.

5. The method of claim 1, further comprising:
   monitoring the performance of each processing core; and
   creating, for each processing core, the wear data for the processing core, wherein wear data describes benchmark measurements for the processing core.

6. The method of claim 5, wherein benchmark measurements, for each of the plurality of processing cores, describe accumulated instructions executed by the processing core.

7. The method of claim 1, wherein the wear data describes a separate wear level for each processing core.

8. The method of claim 7, wherein:
   the wear data describes an age of each of the processing core; and
   moderating accumulation of wear in the plurality of processing cores based on the wear level of the processing cores from at least two different server computers comprises assigning services to processing cores that have a younger age relative to the other processing cores.

9. The method of claim 8, wherein the age of each processing core is based on the originating time in service of the processing core, wherein the originating time in service is indicative of when each processing core was initially put in service.

10. The method of claim 1, wherein the wear data describes a wear level for a server computer that is attributed to the processing cores of the server computer.

11. The method of claim 10, wherein:
    the wear data describes, for each of the server computers, an average age of the processing cores of the server computer; and
    moderating accumulation of wear in the plurality of processing cores based on the wear level of the processing cores from at least two different server computers comprises assigning services to a server computer with younger average age relative to an average age of other server computers.

12. The method of claim 11, further comprising:
determining a separate wear level for each processing core within the server computer to which a service is assigned; and
assigning the service to the processing cores within the server computer so that a relative difference in wear level of the processing cores in the server computer are reduced.

13. The method of claim 1, wherein:
the wear data describes a wear level for a server computer that is attributed to the processing cores of the server computer; and
moderating accumulation of wear in the plurality of processing cores based on the wear level of the processing cores from at least two different server computers comprises:
  distributing tasks to one or more sever computers based on the wear levels for two or more of the server computers, and
  at each server computer to which a task is distributed and for which a number of mapped cores is less than a number of cores in the server computer:
    iteratively remapping the number of mapped cores to a proper subset of cores, wherein the proper subset of cores changes for each iterative remapping; and
    overclocking one or more of the cores in the proper subset of cores to an overclocked value that does not result in an overclocked core exceeding a temperature constraint before a next iterative mapping.

14. The method of claim 1, wherein the accumulated wear that has accumulated from an originating time in service of the processing core comprises at least one of an accumulated number of executed instructions by the processing core, an accumulated time in service since an original installation of a server computer the processing core resides, and an accumulated time in service since the server computer initially executed instructions.

15. A system, comprising:
a data processing apparatus; and
instructions stored on a memory system in communication with the data processing apparatus and that when executed by the data processing apparatus cause the data processing apparatus to perform operations comprising:
  receiving a request for services to be implemented on one or more server computers within a set of two or more server computers within a data center, wherein each server computer includes a plurality of processing cores;
  querying each server computer in the set of two or more server computers for wear data for each processing core of each server computer;
  for each server computer in the set of two or more server computers, receiving the wear data describing, for each processing core of the server computer, a wear level for the processing core that is indicative of accumulated wear that has accumulated from an originating time in service of the processing core; and
  moderating accumulation of wear in the plurality of processing cores, to which services are to be assigned, in a first server computer and a second server computer, the moderating comprising:
    determining, based on the wear level of the processing cores from the first server computer and the second server computer, that the services are to be implemented in one or more of the processing cores of the first server computer and one or more of the processing cores of the second server computer; and
    assigning the services to be implemented in the one or more of the processing cores of the first server computer and the one or more of the processing cores of the second server computer.

16. The system of claim 15, wherein:
the wear data describes an average age of the processing cores for each server computer within the set of one or more server computers; and
the operation of assigning the services to be implemented in one or more of the processing cores based on the wear level of the processing cores comprises assigning services to a server computer with younger average age relative to average age of other server computers.

17. The system of claim 16, further comprising a core manager in each server computer, the core manager configured to perform operations comprising:
determine a separate wear level for each processing core within the server computer to which a service is assigned; and
assign the service to the processing cores within the server computer so that a relative difference in wear level of the processing cores in the server computer are reduced.

18. The system of claim 15, further comprising a core manager in each server computer, the core manager configured to perform operations comprising:
in response to determining that a number of mapped cores is less than a number of cores in the server computer:
  iteratively remapping the number of mapped cores to a proper subset of cores, wherein the proper subset of cores changes for each iterative remapping; and
  overclocking one or more of the cores in the proper subset of cores to an overclocked value that does not result in an overclocked core exceeding a temperature constraint before a next iterative mapping.

19. The system of claim 15, wherein the accumulated wear that has accumulated from an originating time in service of the processing core comprises at least one of an accumulated number of executed instructions by the processing core, an accumulated time in service since an original installation of a server computer the processing core resides, and an accumulated time in service since the server computer initially executed instructions.

* * * * *

UNITED STATES PATENT AND TRADEMARK OFFICE
CERTIFICATE OF CORRECTION

Page 1 of 1

PATENT NO. : 10,218,779 B1
APPLICATION NO. : 15/055300
DATED : February 26, 2019
INVENTOR(S) : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this
Twenty-fourth Day of September, 2019

Andrei Iancu
*Director of the United States Patent and Trademark Office*